United States Patent [19]

Richter

[11] Patent Number: 5,418,817
[45] Date of Patent: May 23, 1995

[54] ADAPTIVE EQUALIZATION SYSTEM AND METHOD

[75] Inventor: Gerard Richter, Saint-Jeannet, France

[73] Assignee: International Business Machines Corporation, Armonk, N.Y.

[21] Appl. No.: 26,319

[22] Filed: Mar. 3, 1993

[30] Foreign Application Priority Data

Jul. 10, 1992 [EP] European Pat. Off. ............ 92480098

[51] Int. Cl.[6] .......................... H03H 7/30; H03H 7/40
[52] U.S. Cl. .................................. 375/232; 375/231; 333/28 R; 364/724.2
[58] Field of Search ............... 375/12, 13, 14; 333/18, 333/28 R; 364/724.19, 724.2

[56] References Cited

U.S. PATENT DOCUMENTS

| | | | |
|---|---|---|---|
| 4,141,072 | 2/1979 | Perreault | 375/12 |
| 4,475,211 | 10/1984 | Mattis, Jr. et al. | 375/15 |
| 4,759,036 | 7/1988 | Meyers . | |
| 4,989,170 | 1/1991 | Batruni et al. | 375/13 |
| 5,159,609 | 10/1992 | Palicot | 364/724.2 |
| 5,214,670 | 5/1993 | Ballatore | 375/12 |

FOREIGN PATENT DOCUMENTS

| | | | |
|---|---|---|---|
| 0006121 | 1/1980 | European Pat. Off. | H04L 25/03 |
| 0125301 | 11/1984 | European Pat. Off. | H04L 25/03 |

OTHER PUBLICATIONS

"Synchronous and Fractionally-Spaced Blind Equalization in Dually-Polarized Digital Radio Links" by R. Raheli and G. Picchi, IEEE International Conference on Communications-ICC'91, Denver, Jun. 23-26, 1991, vol. 1, pp. 156-161.

"Stop-and-Go" Decision Directed Algorithm for Joint Blind Equalization and Carrier Recovery by G. Picchi and G. Prati, IEEE Global Telecommunications Conference, Houston, Tex., Dec. 1-4, 1986, Conference Record, vol. 3, pp. 1646-1651.

*Primary Examiner*—Stephen Chin
*Assistant Examiner*—Amanda T. Le
*Attorney, Agent, or Firm*—John J. Timar

[57] ABSTRACT

Adaptive equalization system for allowing the equalization of a base-band line of a DCE, includes an adaptive filter for adjusting its coefficients in accordance with an adaptive algorithm. The equalizer includes controls to work during a preliminary period, in an adaptive or non-adaptive mode according to the convergence of the recursive algorithm process. The algorithm is triggered depending on whether the equalized signal belongs to one of several predefined intervals of convergence. After this preliminary period, when the mean square of the residual error is considered small enough to ensure the convergence of the adaptive process, the algorithm is computed on a continuous mode.

5 Claims, 7 Drawing Sheets

ADAPTIVE EQUALIZATION SYSTEM AND METHOD

FIELD OF THE INVENTION

The invention relates to data communication system and particularly to an adaptive equalization system allowing the equalization of a telecommunication baseband line without training sequence.

PRIOR ART

As illustrated in FIG. 1, synchronous data transmission over a digital or an existing telephone network (002) generally requires receivers to implement equalization to compensate the amplitude and phase delay characteristic of the channel (011) and to be able to recover the original data sent by the transmitter (001). Most equalizers (004) presently used in digital modems or Data Circuit Terminating Equipments (DCE) are of a transversal filter type (003). Various methods have been developed (005) for adjusting their coefficients (010) automatically, but basically we can discern two kinds of process:

Series of isolated pulses are sent prior to data transmission. This, so-called, training sequence during this initial period allows the equalizer (004) to determine its coefficients (010) and to keep them constant during the subsequent period of data transmission.
  Adaptative Equalization: coefficients (010) are initiated by a training sequence or directly derived from the received data signal (006) and are continuously adjusted in a way to minimize the deviation (009) between the sampled output signal (007) and a reference signal (008). This is the most used technique in receivers.

It is well known in the art that in establishing communications between modems, the transmission of a known sequence of pseudorandom data over the channel during a short period (training sequence) allows the equalizer to establish bit synchronization, to derive an ideal reference signal and to initiate the recursive determination of its coefficients. When actual data are transmitted, the residual distortion has usually decreased to a small value and the equalizer can use the reconstructed output signal of the receiver as reference signal. The adaptative process continues to be effective during the entire period that data is transmitted.

However it has appeared that in some situations it is impossible for a digital modem which is connected to a telecommunication network to transmit or receive any training sequence. FIGS. 2 and 3 show two typical examples in which no training sequence is allowed. In FIG. 2, a base-band modem (101) is connected to a digital network (103) via an input node (102). The network does not authorize the base-band modem to transmit and to receive any training sequence through the digital network. The latter modem has to adjust its equalizer directly without the use of a training pattern.

FIG. 3 illustrates a similar case of a multipoint network (203) in which a control station (201) communicates with some tributary stations (202). Since the connection of an extra tributary station (202) should not interrupt the communication of the already existing stations, the equalizer system included into this supplementary station has to adjust its coefficient without the use of any training sequence.

European patent application number 91480088.3, filed on May 31, 1991 and not published at the date of filing the present application, discloses an equalization process in which several sets of initial coefficients corresponding each to a specific telecommunication line are stored in the equalizer system. By measuring the energy of the received signal, the system derives among all the sets stored, the set of coefficients able to initiate the adaptive process and to ensure the convergence of the algorithm. However, this solution requires:

the a priori knowledge of the typical characteristics of the lines on which the equalizer is supposed to work
  the presetting of the coefficient values in the system over the complete range of the applications

OBJECTS OF INVENTION

The technical problem to be solved by the present invention is to provide, for a Data Circuit Terminating Equipment receiving a digital signal from an existing telecommunication network, a method to initiate the convergence process of an adaptive equalizer whatever the characteristics of the transmission path used and which does not require the sending of any training sequence.

BRIEF SUMMARY OF THE INVENTION

This problem is solved by the adaptative equalization system in accordance with the present invention which includes means for executing a recursive algorithm, in a preliminary phase, only when the equalized signal is located inside ranges of predefined values called intervals of convergence. In a preferred embodiment, the intervals are determined, around the representative points of the digital signal expected, in a way to ensure a fast and accurate convergence. After this learning period, when the mean square of the residual error is considered small enough to ensure the convergence Of the adaptive process, the algorithm is computed in a continuous mode, as usual.

An efficient and very simple equalization method is provided which is ensured to converge whatever the characteristics of the line. More accurately, the system according to the present invention includes the means which are recited in claim 1.

Preferably, the system in accordance with the present invention includes an adaptive digital equalizer using a digital processing system involving a Mean-Square or Gradient algorithm.

DETAILED DESCRIPTION OF THE PREFERRED EMBODIMENT OF THE INVENTION

Figure 1:
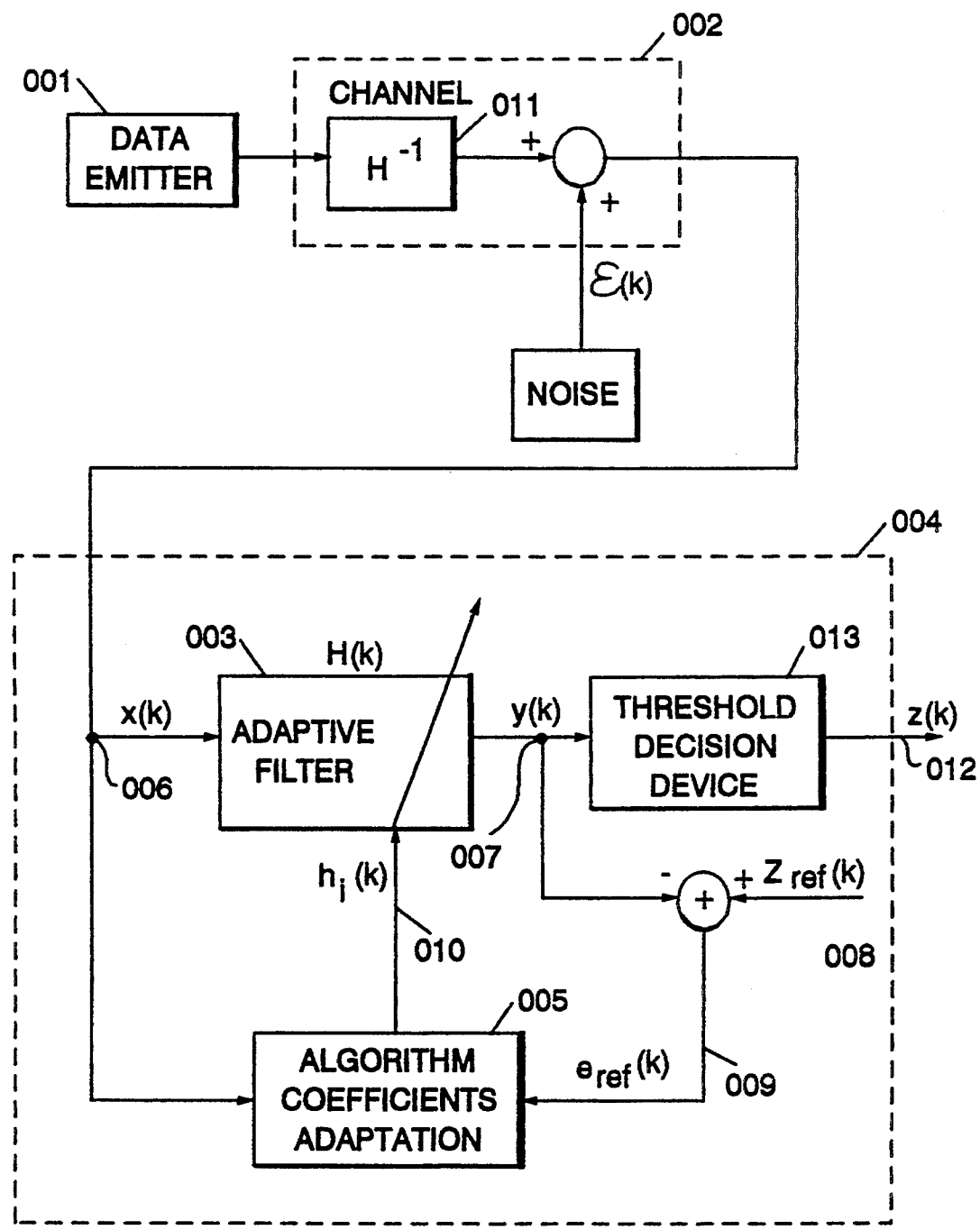
FIG. 1 illustrates the general principle of a prior art data transmission system that may employ an adaptative equalizer in accordance with the present invention.
Figure 2:
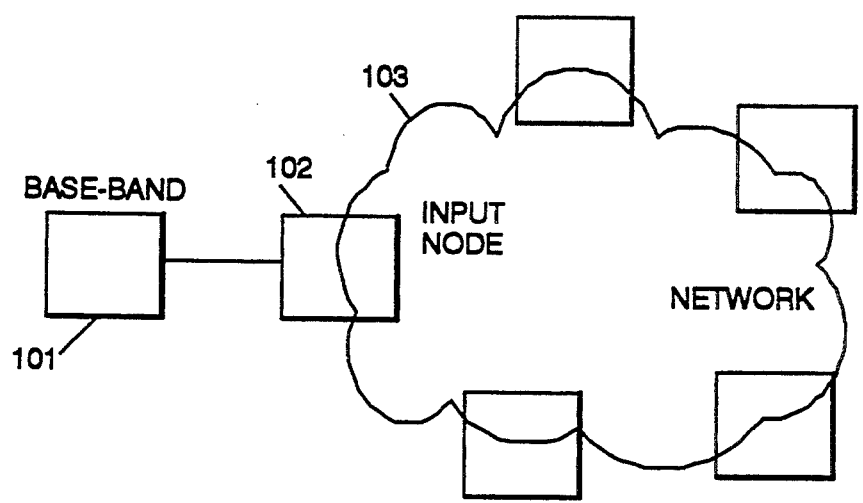
FIG. 2 illustrates a prior art digital network in which one may advantageously use a DCE in accordance with the present invention.
Figure 3:
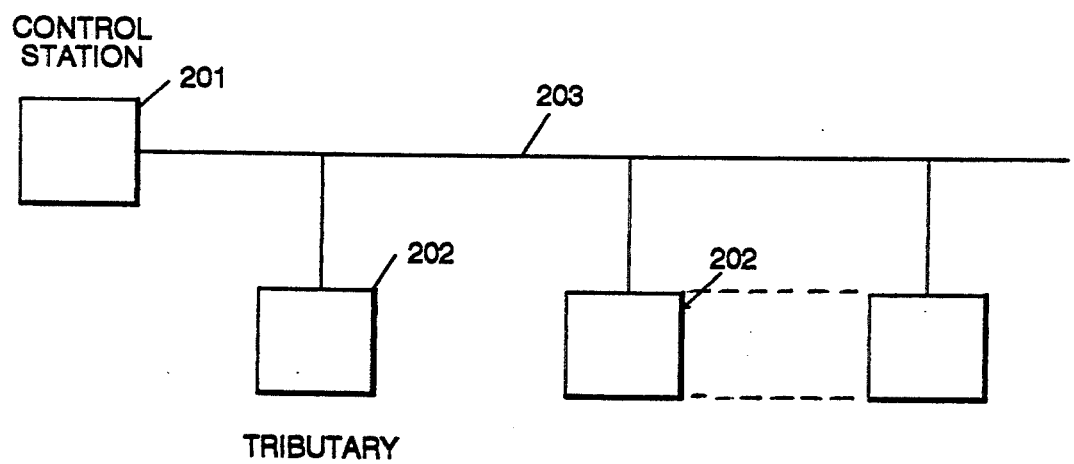
FIG. 3 shows a prior art multipoint connection network in which one may advantageously employ a DCE according to the present invention.
Figure 4:
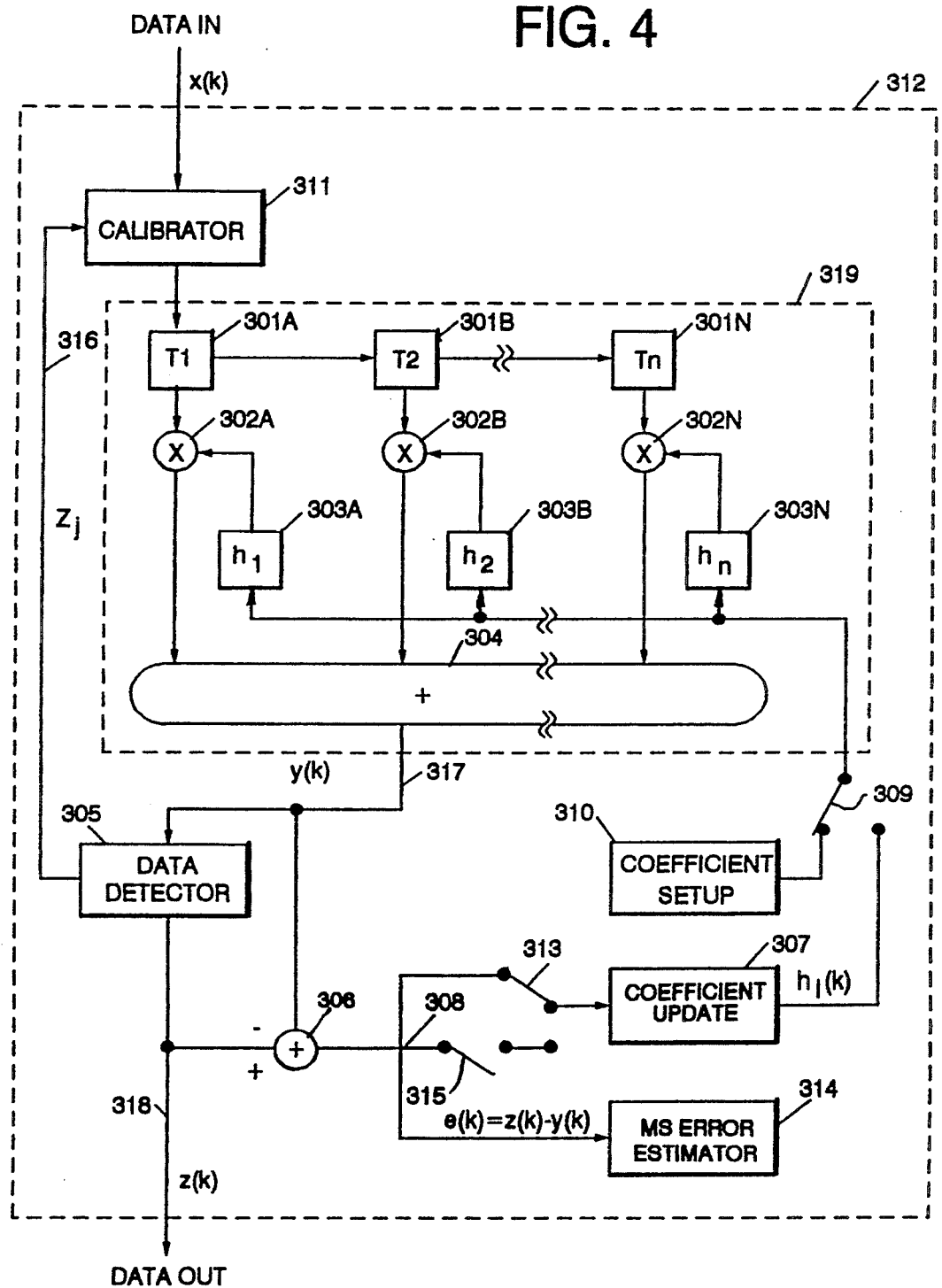
FIG. 4 shows a preferred embodiment of the structure of an adaptive equalizer in accordance with the present invention.

FIG. 4 shows the structure of a digital adaptive equalizer 312 in accordance with the present invention. In the preferred embodiment of the invention, the equalizer is based on a digital processing system using a digital filter (319). The equalizer 312 includes a plurality of taps 301a–301n for storing values x(k) (x(k) being the k-th input sample) of the incoming signal, a plurality of multipliers 302a to 302n, a means 304 for summing the products of the plurality of multipliers 302a to 302n. Summing means 304 generates the series of equalized data y(k) which is then entered into a data detector 305 for data recovery which derives the estimated data bits z(k). The equalizer output y(k) at the output of summing means 304 is also subtracted from the output z(k) of data detector 305 by means of subtractor 306 in order to provide an error signal 308 which is then transmitted to COEFFICIENT UPDATE block 307.

Block 307 performs an analysis of the error signal 308 provided at the output of subtractor 306 and derives a new set of coefficients for taps 301a to 301n in accordance with a determined algorithm. A well known algorithm which is traditionally used to compute the set of coefficient is the Gradient or Mean Square algorithm which continuously minimizes the mean-square error between the output data signal and the reference signal.

Let us call hi(k) tile i-th coefficient of the filter which is stored in coefficient block 303i corresponding to multiplier 302i, X(k) the vector comprising a set of N samples:

$$X(k) = \begin{vmatrix} x(k) \\ x(k-1) \\ \cdot \\ \cdot \\ \cdot \\ x(k-N+1) \end{vmatrix}$$

H(k) the vector formed by the N coefficients which are stored into coefficients blocks 303a to 303n:

$$H(k) = \begin{vmatrix} h1(k) \\ h2(k) \\ \cdot \\ \cdot \\ \cdot \\ hN(k) \end{vmatrix}$$

The output y(k) is related to the input X(k) by the following relation:

$$y(k) = X(k).H(k)^T$$

where XT(k) is the transpose of the vector X(k), i.e:

$$X(k)^T = x(k), x(k-1), x(k-2) \ldots, x(k-N+1)$$

The reference signal zref(k) can be described as the superposition of the equalized signal with a residual error component:

$$zref(k) = X(k).H(k)^T + eref(k)$$

The vectorial representation is:

$$Zref(k) = Xk.H(k)^T + Eref(k)$$

with the N×k matrix Xk defined as:

$$Xk = \begin{vmatrix} x(1) & x(2) & \ldots & x(k) \\ x(0) & x(1) & & x(k-1) \\ \cdot & \cdot & & \cdot \\ \cdot & \cdot & & \cdot \\ \cdot & \cdot & & \cdot \\ x(-N+2) & x(-N+3) & \ldots & x(k-N+1) \end{vmatrix}$$

The Mean-Square algorithm involved in block 307 is intended to minimize the mean square of the residual error (MS):

$$MS(k) = \underset{p=1}{\overset{p=k}{SUM}}(zref(p) - X(p).H(k)^T)^2 = \underset{p=1}{\overset{p=k}{SUM}} eref(p)^2$$

The algorithm is implemented as follows:

$$Zref(k) = Xk.H(k)^T + Eref(k)$$

$$Xk.Zref(k) = Xk.Xk.H(k)^T + Xk.Eref(k)$$

The solution for the hn(k) coefficient is given by the following equation:

$$H(k) = (XkXk^T)^{-1} . Xk.Zref(k)$$

with the mean square condition:

Xk.Eref(k)=0

The function H(k) converges to an optimum H* when k tends to the infinite:

$$H^* = E(H(k)) = E((X_k X_k^T)^{-1}) \cdot E(X_k Z_{ref}(k))$$

The uniqueness and existence of H* is ensured by the invertibility of the matrix:

$$X_k X_k^T$$

From the following relationships:

$$H(k+1) = (X_{k+1} X_{k+1}^T)^{-1} \cdot X_{k+1} Z_{ref}(k+1)$$

$$X_{k+1} X_{k+1}^T = X_k X_k^T + X(k+1) \cdot X(k+1)^T$$

$$X_{k+1} Z_{ref}(k+1) = X_k Z_{ref}(k) + X(k+1) \cdot z_{ref}(k+1)$$

the recursive expression of the Mean Square algorithm is derived:

$$H(k+1) = H(k) +$$

$$(X_{k+1} X_{k+1}^T)^{-1} \cdot X(k+1) \cdot (z_{ref}(k+1) - X(k+1)^T \cdot H(k))$$

This expression progressively converges to the optimum.

As the coefficients of H cannot be calculated directly at each received sample because this would use too much computation power, the algorithm is simplified according to the Gradient method:

$$H(k+1) = H(k) + p \cdot X(k) \cdot (z(k) - X(k)^T \cdot H(k))$$

or $$H(k+1) = H(k) + p \cdot X(k) \cdot e(k)^T$$

where z(k) is an estimation of the reference signal zref(k) reconstructed from the equalized signal y(k);

e(k) is the estimation o! f the residual error eref(k) derived from. y(k) and the reconstructed reference signal z(k); and p is an approximation of the expression:

$$(X_{k+1} X_{k+1}^T)^{-1}$$

p is called step size and is chosen as a small positive constant. It is used in order to adjust the convergence process.

It has appeared that the Convergence of the Gradient algorithm performed by block 307 of FIG. 4 is ensured, at the process initiation, for a vector H(k) in the neighborhood of H*. If the latter requirement is not satisfied, the vector H(k) converges toward other stationary points, each having its own attraction domain. As mentioned above, a well known method to reach initially the proximity of H* involves the use of an initial training period during which a reference signal is sent to the equalizer and used to adjust the coefficients. In a multipoint data network or still in a digital network, no learning sequence is available since a control station can not send this sequence when a tributary station is connected to the network.

The convergence of Gradient algorithm is initiated in a first stage by means of blocks 310, 311 and functional switches 309 and 315. Prior to the adaptive process, the input x(k) is calibrated through the CALIBRATOR block 311, in function of predefined discrete values Zj (316) representative of the reference signal z(k) in output of the DATA DETECTOR threshold decision block 305. The algorithm is assumed to converge in the proximity of these particular points Zj within intervals chosen to minimize the effect of false decisions. Block 311 CALIBRATOR measures the extreme values of x(k) and adapts the amplitude of the input signal to the range of values ZM, ..., Zj, ..., Zm covered by the DATA DETECTOR block 305.

The presetting of the coefficients is performed by means of switch 309 which connects the COEFFICIENT SETUP block 310 to the input of the blocks 303a to 303n. For its first iteration, the equalizer is configured as a simple delay line. The initial vector Hint=H(1) is configured as follows:

$$H(1) = \begin{vmatrix} h1(1) \\ h2(1) \\ \cdot \\ \cdot \\ hN+1/2(1) \\ \cdot \\ \cdot \\ hN(1) \end{vmatrix} = \begin{vmatrix} 0 \\ 0 \\ \cdot \\ 0 \\ 1 \\ 0 \\ \cdot \\ 0 \\ 0 \end{vmatrix}$$

The delay generated in output is equal to 1—(N+1)/2:

$$y(1) = x((1-N)/2)$$

The symmetrical structure of the vector H minimizes the phase distortion of the equalizer at the convergence point.

After this initial phase, the system enters in a preliminary adaptive period. The coefficients are updated only for the equalized values y(k) included in the predefined intervals of convergence. The algorithm is triggered by means of the switch 315 on the following criterion:

$$|e(k)| = |y(k) - z(k)| = |y(k) - Z_j| < I_j$$

where Ij is the interval of values associated with the representative point Zj of the reference signal z(k).

For $|y(k) - Z_j| > I_j$ the algorithm is not processed, the estimated error being too large to ensure the convergence. To simplify the process:

the convergence interval can be identical for all the points Zj: IM, ... Ij, ... Im=I the interval Ij can be determined as a fraction of the segment of values between two neighboring points Zj and Zi:

$Ij = q|Zj - Zi|$ with $q < 0$

Its size depends of the maximal distortion described in the specifications or expected in output of the transmission line and of the convergence time required.

the number of points considered to trigger the algorithm can be limited to the most discriminating, in particular the maximum YM and the minimum Ym. These two values can be associated with a negligible false decision rate, in normal conditions of noise on the channel, to the extreme points ZM and Zm of the reference signal z(k). The error rate inside an area limited by the interference domain of the adjacent points can be considered small enough to ensure the convergence.

The mean square of the residual error is computed at each iteration and is used as a convergence indicator. Below a given threshold:

$$MS(k) < MSref$$

the algorithm is assumed to be convergent and is processed on a continuous mode. The functional switch 313 allows the permanent adaptation of the coefficients by connecting the error signal e(k) directly on the COEFFICIENT UPDATE block 307. The mean square error is equal to:

$$MS(k) = 1/k \cdot \sum_{p=1}^{p=k} (z(p) - X(p) \cdot H(k))^T{}^2 = 1/k \cdot \sum_{p=1}^{p=k} e(p)^2$$

From the previous equation, the associated recursive algorithm is:

$$MS(k+1) = k/(k+1) \cdot MS(k) + 1/(k+1) \cdot e(k+1)^2$$

To speed up the adaptation period, the mean square error is estimated within a predefined window contituted with the P most recent values of the error e(k).

$$MSP(k) = 1/P \cdot \sum_{p=k-P+1}^{p=k} (z(p) - X(p) \cdot H(k))^T{}^2 = 1/k \cdot \sum_{p=k-P+1}^{p=k} e(p)^2$$

and $$MSP(k+1) = MSP(k) + 1/P \cdot (e(k+1)^2 - e(k-P+1)^2)$$

The MS ERROR ESTIMATOR block 314 uses a simplified version of the recursive equation to avoid the storage of the P previous values of e(k):

$$MSP(k+1) = (P-1)/P \cdot MSP(k) + 1/P \cdot e(k+1)^2$$

The size of the window defined with the number of values P determines:

the speed of the adaptation: the smaller the window, the faster is the adaptation.

the accuracy of the convergence: the larger the window, the better is the accuracy.

Figure 5:
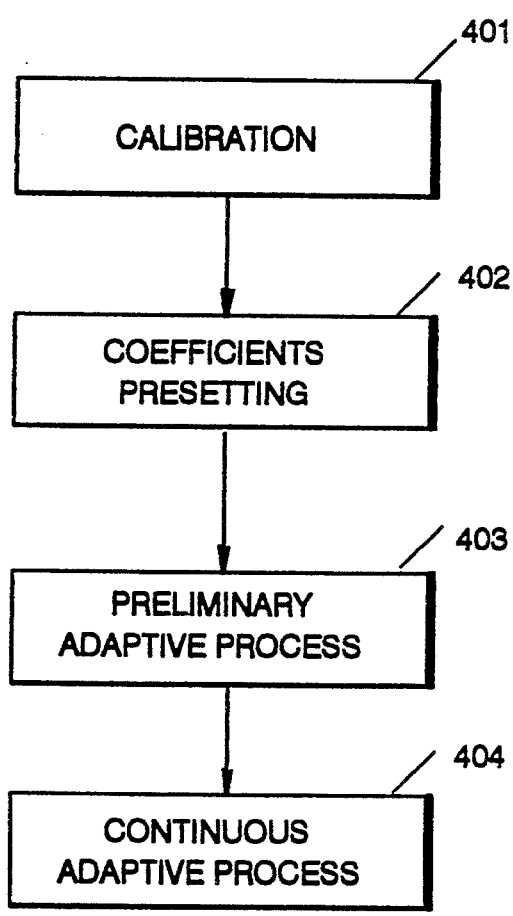
FIG. 5 illustrates the basic principle of the equalization process in accordance with the present invention.

FIG. 5 illustrates the basic operations which are involved in accordance with the present invention.

When the DCE is connected to a telecommunication network, the equalizer is put in an initiation phase: the signal received by the modem is analyzed by block 311 in order to determine its maximum XM and minimum Xm values, step 401. From this measure the input x(t) is calibrated in a way to cover the entire spectrum of values ZM, ..., Zj, ..., Zm of the reference signal z(k).

The intervals of convergence that will be used by the switch 315 to trigger the adaptive process are derived from the discrete points Zj preset in the DATA DETECTOR block 305.

The initial set of coefficients is then entered into the coefficient blocks 303a to 303b of equalizer 312 by means of the switch 309, step 402. This set does not match with the characteristic of the line, but is, however, such that the convergence can be initiated.

The equalizer is then switched in a preliminary adaptive mode: the computed signal y(k) is compared with the reference signal z(k) through the switch 315, step 403:

If the difference between y(k) and the associated discrete value Zj in output of the threshold decision device is smaller than a given value Ij previously defined as the interval of convergence, the algorithm is processed and the block 307 is operative.

If the condition is not fulfilled, the coefficients are not updated.

When the mean square error estimated in block 314, falls below a given threshold MSref, the coefficients are assumed to be near enough to the optimal vector H* to ensure the convergence of the algorithm. The value of MSref must be chosen as great as possible to limit the initiation time while ensuring the accuracy of the convergence. The switch 313 allows the adaptive process to run on a normal adaptive mode involving the continuous adjustment of the coefficients in order to perfectly compensate the attenuation curve of the transmission line, step 404.

The adaptive equalizer becomes therefore able to adapt itself directly on the incoming signal without requiring the use of any training sequence and without the initial setting of particular coefficient sets.

Figure 6:
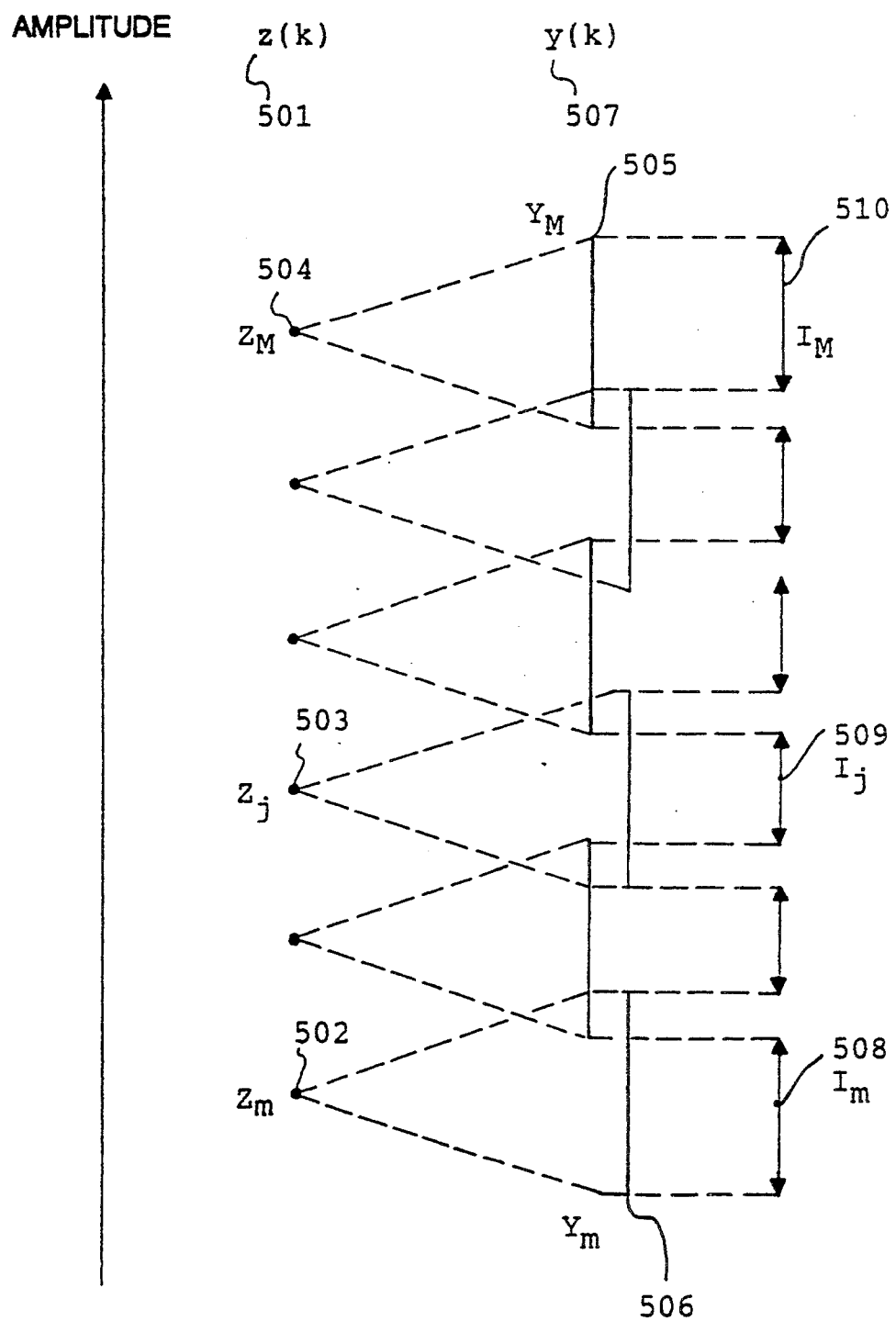
FIG. 6 illustrates the determination of the convergence domains, used during the preliminary adaptive period, around the representative values of the reference signal in accordance with the present invention.

FIG. 6 illustrates the measure executed by the CALIBRATOR block 311 and the determination of the convergence domains around the representative values Zj of the reference signal z(k) according to the present invention. The reference z(k)(501) processed in the DATA DETECTOR block 305, is a digital signal described by a predetermined number of discrete values Zm, ..., Zj, ..., ZM (502, 503 and 504). During the initial phase, the input x(k) is measured by the CALIBRATOR block 311 and its amplitude adapted to the output level of the equalizer. The calibration is executed in a way to cover all the range of values of the equalized signal y(k) (507)—from YM (505) to Ym (506)—and of the associated reference signal z(k) (501)—from ZM (504) to Zm(502). The intervals of convergence Im, ..., Ij, ..., IM, (508, 509 and 510), inside which the coefficients are updated in the preliminary adaptive period, are determined around the representative points Zm, ..

., Zj, ..., ZM. These intervals are limited by the interference zone of the neighboring points.

Figure 7:
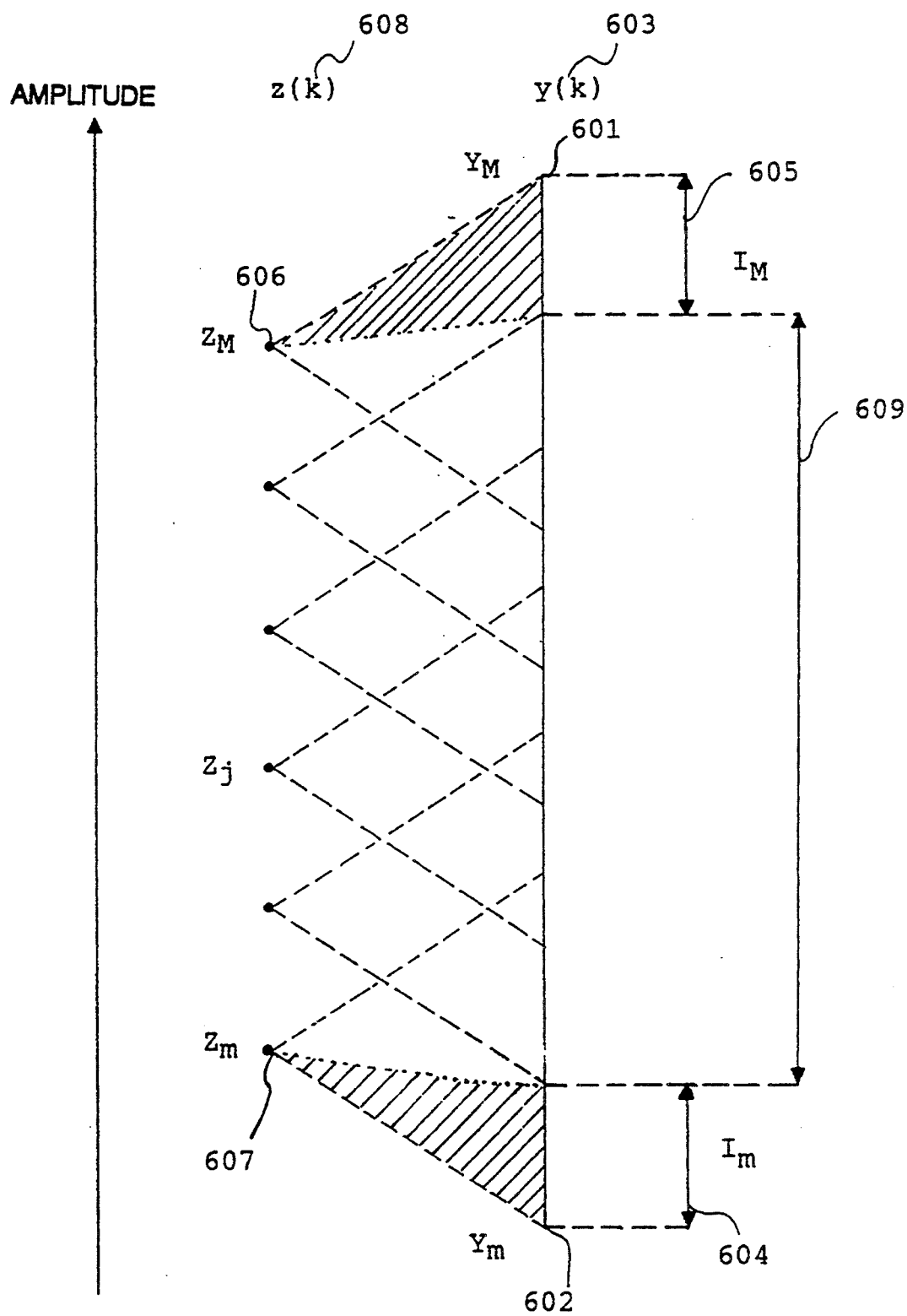
FIG. 7 illustrates, in case of important distortion, the convergence domain around the maximum and minimum values of the received signal in accordance with the present invention.

FIG. 7 illustrates the convergence domain of the algorithm around the maximum and minimum values of the received signal according to the present invention. In case of important distortion on the transmission channel, each representative point of the original signal can interfere at the reception with its adjacent points reducing dramatically the convergence domain used to trigger the adaptive process. This superimposition of data called intersymbol interference (609) generates a composite signal. However, this effect is less sensible in the proximity of the maximum XM and minimum Xm values of the input x(k). As a matter of fact, it is possible to associate the two points YM (601) and Ym (602) of the equalized signal y(k) with the extreme values of the reference signal z(k) (608), ZM (606) and Zm (607). The mean square of the residual error around these particular points (604 and 605) is estimated, in normal conditions of noise on the line, small enough to initiate the convergence during the preliminary adaptation phase.

Figure 8:
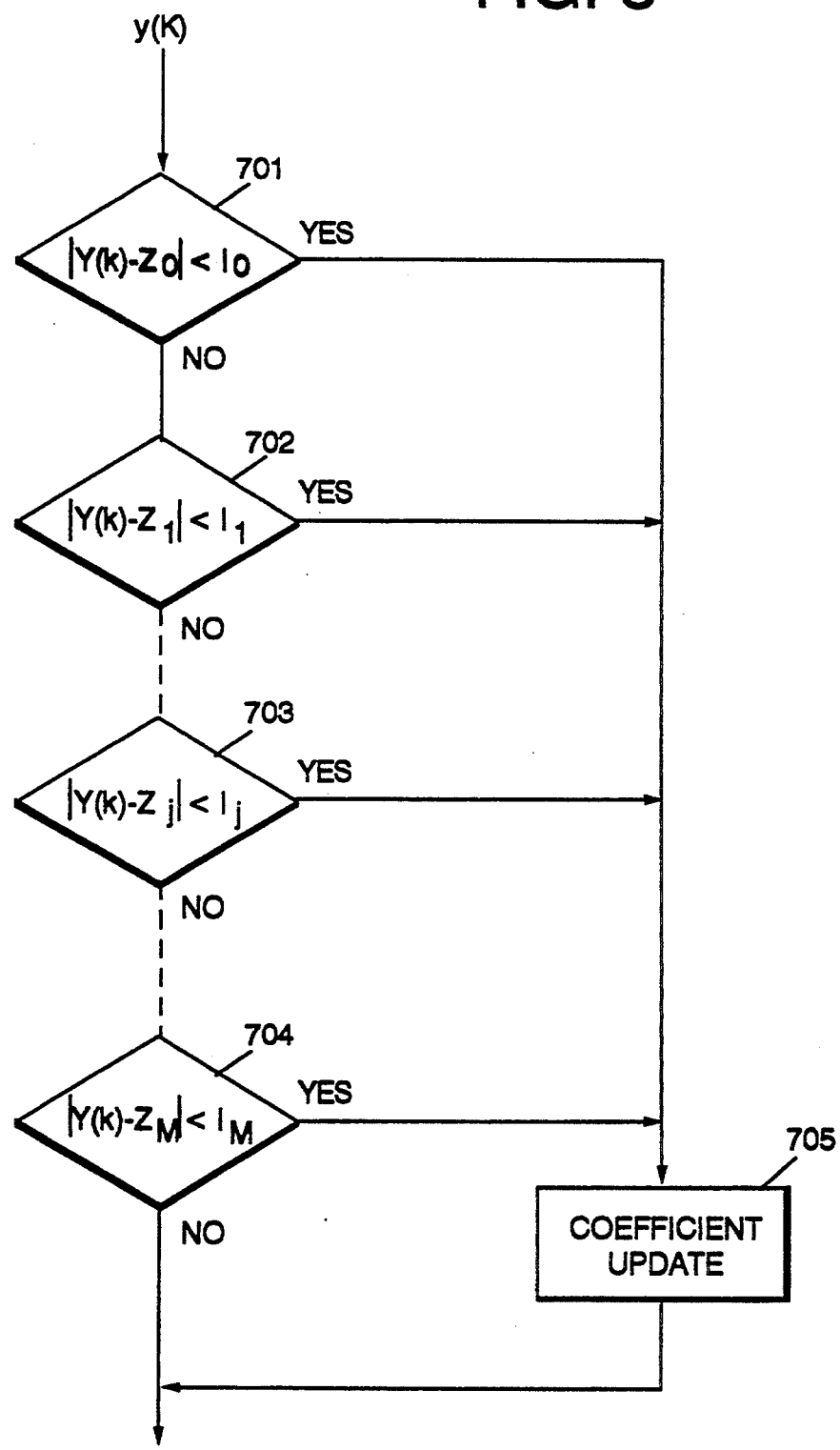
FIG. 8 is a detailed flow chart of the computation process used in preliminary mode to trigger the adaptative process of the equalizer in accordance with the present invention.

FIG. 8 details the computation process or method for allowing the coefficient update during the preliminary adaptative period, step 403. First, a comparison, step 701, is performed in order to determine if the computed signal y(k) is included within the convergence interval I0 around the first reference point Z0. If y(k) lies inside the interval I0, that means, if the condition $|y(k)-Z0|<I0$ is satisfied, the residual error is estimated to be small enough to ensure the convergence. The algorithm is processed, through the switch 315 and the block 307 and the coefficients are adjusted in order to adapt the equalizer to the characteristics of the transmission line, step 705. In the reverse case if y(k) is not included in this first interval of value, a second test is performed at the point Z1 With the associated interval I1, step 702. If the test fails again, the iteration goes on with the next point.

In case of repeated checks, all the points are successively tested, step 703, until the last one, step 704. If this last test is not successful the algorithm is not triggered and the coefficients remain unchanged. In case of important distortion, the signal y(k) can interfere with several points reducing the convergence domain of the algorithm. A solution is to limit the number of reference points to the two extreme values: the Maximum and the Minimum. These two particular points have the property that they correspond with a very high probability to the extreme points of the reference signal. They can be considered as being out of the sphere of influence of their contiguous points and the equalization error in their proximity can be maintained to a low level.

Having thus described the invention, what is desired to be protected by letters patent is set forth in the claims which follow by way of example only, and not of limitation.

What is claimed is:

1. A system for adaptive equalization of a telecommunication line, said system including a calibrator (311) for receiving an input signal, an adaptive filter (319) connected to said calibrator and having a plurality of coefficients said plurality of coefficients being adapted in accordance with a predetermined adaptive algorithm (307), and a threshold decision device (305) for receiving an output (317) of said adaptive filter for data recovery, said adaptive equalization system including:

first means (310) for storing an initial plurality of filter coefficients for said adaptive filter;

second means (314) for storing a mean square error threshold;

means (309), connected to said first means for storing, for loading the stored initial plurality of filter coefficients in said adaptive filter (319) and for initiating said adaptive equalization;

means (315) for processing the equalized signal in an adaptive mode by triggering said adaptive algorithm and updating the plurality of filter coefficients (307) when said equalized signal (317) that is the output of the adaptive filter to said threshold decision device (305) is within one of a plurality of predefined intervals of convergence stored within said threshold decision device (305), wherein said intervals of convergence are defined around a plurality of discrete decision values called representative points stored in the threshold decision device (305), said intervals of convergence selected to ensure the convergence of the adaptive equalization;

means (315) for processing the equalized signal in a nonadaptive mode by not updating the plurality of filter coefficients (307) when said equalized signal (317) that is the output of said adaptive filter is outside each of said predefined intervals of convergence;

means (314) for continuously estimating a mean square residual error derived from said equalized signal;

means, connected to said second means for storing and to said means for estimating, for comparing said estimated mean square residual error with said stored mean square error threshold; and means, connected to said means for comparing, for switching (313) the adaptive equalization to a continuous adaptive mode when said mean square residual error falls below said mean square error threshold.

2. The system for adaptive equalization according to claim 1 wherein said intervals of convergence are defined around a maximum value and a minimum value of the equalized signal (317) that is the output of the adaptive filter.

3. The system for adaptive equalization according to any one of claims 1–2 wherein said adaptive algorithm is a Gradient or Mean Square error adaptive algorithm.

4. A method for equalizing a telecommunication line by using an adaptive equalizer (312) said method comprising the steps of:

storing a plurality of intervals of convergence, wherein said intervals of convergence are defined around a plurality of discrete decision values called representative points stored in a threshold decision device (305), said intervals of convergence being determined in order to ensure the convergence of an adaptive process;

storing (314) a mean square error threshold;

measuring an input signal of the adaptive equalizer (312) and calibrating the input signal over the intervals of convergence covered by the threshold decision device (305);

storing (310) an initial plurality of filter coefficients for said adaptive equalizer (312);

loading said initial plurality of filter coefficients in said adaptive equalizer (312) and initiating an adaptive algorithm;

triggering (315) said adaptive algorithm and updating said plurality of filter coefficients (307) when an equalized signal (317) generated by the adaptive equalizer is within one of a plurality of preset intervals of convergence; continuously estimating (314) a mean square residual error derived from said equalized signal;

comparing the estimated mean square residual error with said stored mean square error threshold; and switching (313) said adaptive equalizer to a continuous adaptive mode when said estimated mean square error falls below said mean square error threshold.

5. The method according to claim 4 wherein said adaptive algorithm is a gradient or mean-square error adaptive algorithm.

* * * * *